(12) United States Patent
Asano et al.

(10) Patent No.: US 6,288,672 B1
(45) Date of Patent: Sep. 11, 2001

(54) HOLOGRAPHIC RADAR

(75) Inventors: Yoshikazu Asano; Tomohisa Harada, both of Aichi (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 0 days.

(21) Appl. No.: 09/394,088

(22) Filed: Sep. 13, 1999

(30) Foreign Application Priority Data

Sep. 14, 1998 (JP) ................................................ 10-260138

(51) Int. Cl.[7] ...................................................... H01Q 3/02
(52) U.S. Cl. ............................................ 342/374; 342/368
(58) Field of Search ...................................... 342/374, 432, 342/433, 368; 455/562

(56) References Cited

U.S. PATENT DOCUMENTS

| | | | |
|---|---|---|---|
| 4,924,235 | * 5/1990 | Fujisaka et al. | 342/374 |
| 5,455,590 | 10/1995 | Collins et al. | |
| 5,583,511 | * 12/1996 | Hulderman | 342/175 |
| 5,859,609 | * 1/1999 | Sheen et al. | 342/179 |

FOREIGN PATENT DOCUMENTS 63-256879  10/1988  (JP) .
07-210073  8/1995  (JP) .

OTHER PUBLICATIONS

Kuniyoshi Yamane, et al. "A Holographic Imaging Method for automotive Radar", Electronic Information Communication Academy Institute Memoir B–II, vol. J81–B–II, No. 8, Aug. 1998, pp. 805–813 (with English Abstract).

* cited by examiner

*Primary Examiner*—Ian J. Lobo
(74) *Attorney, Agent, or Firm*—Oblon, Spivak, McClelland, Maier & Neustadt, P.C.

(57) ABSTRACT

High-frequency signals from an oscillator (10) are transmitted, through a power divider (12) and a switch (14), from transmission antennas (T1, T2, T3). Reflection waves reflected by targets are received by reception antennas (R1, R2) to thereafter be fed via a switch (16) to a mixer (18). The mixer (18) is supplied with transmission high-frequency signals from the power divider (12) to retrieve beat-signal components therefrom, which in turn are converted into digital signals for the processing in a signal processing circuit 22. The transmission antennas (T1 to T3) and the reception antennas (R1, R2) are switched in sequence whereby it is possible to acquire signals equivalent to ones obtained in radars having a single transmission antenna and six reception antennas.

13 Claims, 3 Drawing Sheets

| T1 | T2 | T3 | T1 | ... |
|----|----|----|----|-----|
| R1 | R2 | R1 | R2 | R1 | R2 | R1 | R2 | ... |
FIG. 2
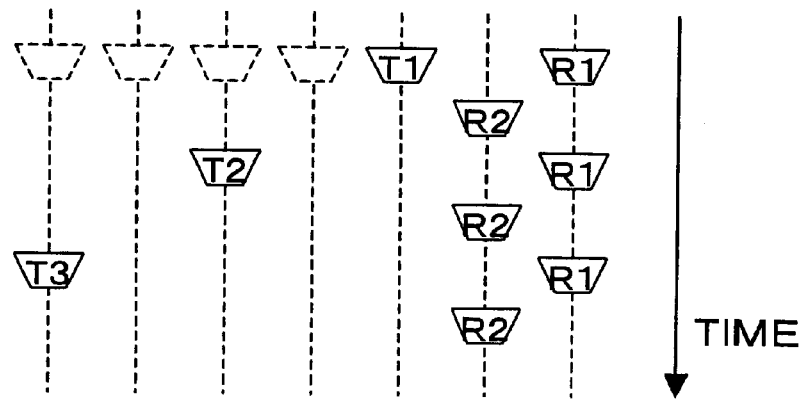
FIG. 3
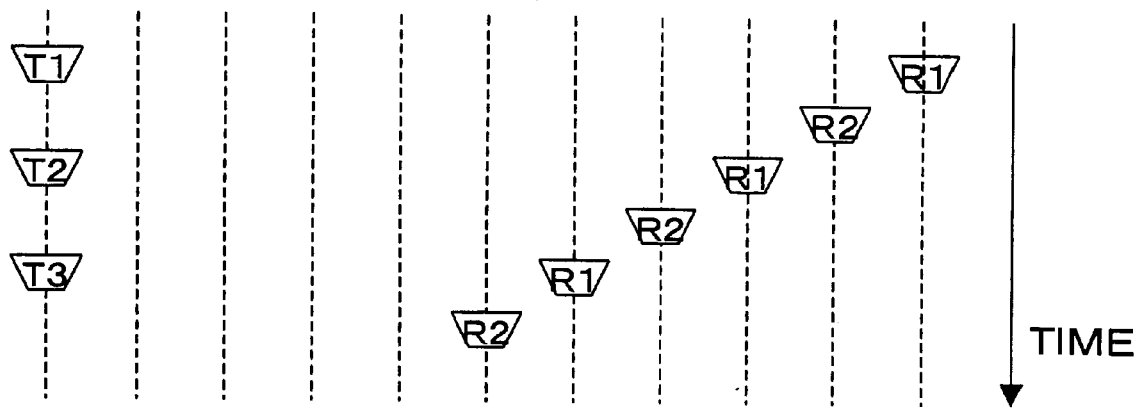
FIG. 4

HOLOGRAPHIC RADAR

BACKGROUND OF THE INVENTION

1. Field of the Invention

The present invention relates to a holographic radar having a plurality of reception antennas for receiving reflection waves of a radio wave transmitted from transmission antennas, and especially to such a holographic radar in which radar signals are acquired in a time-shared manner by the connections of the plurality of reception antennas switched in sequence to a receiver.

2. Description of the Related Art

An example of conventional holographic radar is disclosed in Japanese Patent Laid-open Publication No. Sho 63-256879. In that example, a single transmission antenna is provided to transmit a radio wave, with a plurality of reception antennas receiving reflection waves of the radio wave transmitted. The plurality of reception antennas are then connected via a switch to a single receiver. The plurality of reception antennas are switched in sequence for the connection to the receiver so that radar signals obtained for each reception antenna can be acquired in a time-shared manner.

Such a configuration enables the number of receiver for a plurality of reception antennas to be single and achieves a reduction in size and production cost of the device. It is to be noted that this example includes a reception antenna array consisting of multiple reception antennas, which are associated with a single receiver in groups of four antennas.

The radio wave used herein are in a high-frequency band of, for example, 76 GHz. For this reason, signals handled in the transmission line from the reception antennas to the receiver are signals belonging to the high-frequency band. The switch for switching such high-frequency signals typically has two or three throws.

Because of the above configuration, a plurality of switches are often required for the switching of four or more reception antennas. For example, multi-switching can be implemented through a combination of single pole double throw (SPDT) switches or single pole triple throw (SP3T) switches in a tournament form. Unit switches used therein can be planar circuit type high-frequency switches such as MMICs (microwave monolithic integrated circuits) or HICs (hybrid integrated circuits).

Use of switches in multi-stage connection, however, may cause a degradation in reception sensitivity since a signal will be attenuated every time it passes through each switch.

SUMMARY OF THE INVENTION

It is therefore the object of the present invention to provide a holographic radar capable of preventing any degradation in reception sensitivity with a relatively simple configuration.

The present invention provides a holographic radar having a plurality of reception antennas for receiving reflection waves of a radio wave transmitted from transmission antennas, the connection of the plurality of reception antennas to a receiver being switched in sequence to thereby acquire radar signals in a time-shared manner, wherein a plurality of transmission antennas are provided and switched in sequence for the transmission of the radio wave.

According to the present invention, the number of reception antennas can be reduced by switching the plurality of transmission antennas. It is thus possible to reduce the number of switches for switching the reception antennas and to enhance the reception sensitivity. Furthermore, the reduction in the number of the antennas and switches leads to lowered production costs of the device.

BRIEF DESCRIPTION OF THE DRAWINGS

FIG. 2 illustrates the sequence of switching of antennas effected in the embodiment;

FIG. 3 is an explanatory diagram of switching of the antennas effected in the embodiment;

FIG. 4 is another explanatory diagram of switching of the antennas effected in the embodiment.

DESCRIPTION OF THE PREFERRED EMBODIMENT

The present invention will now be described with reference to the accompanying drawings which illustrate an embodiment of the present invention to explain, but not to limit, the invention.

Figure 1:
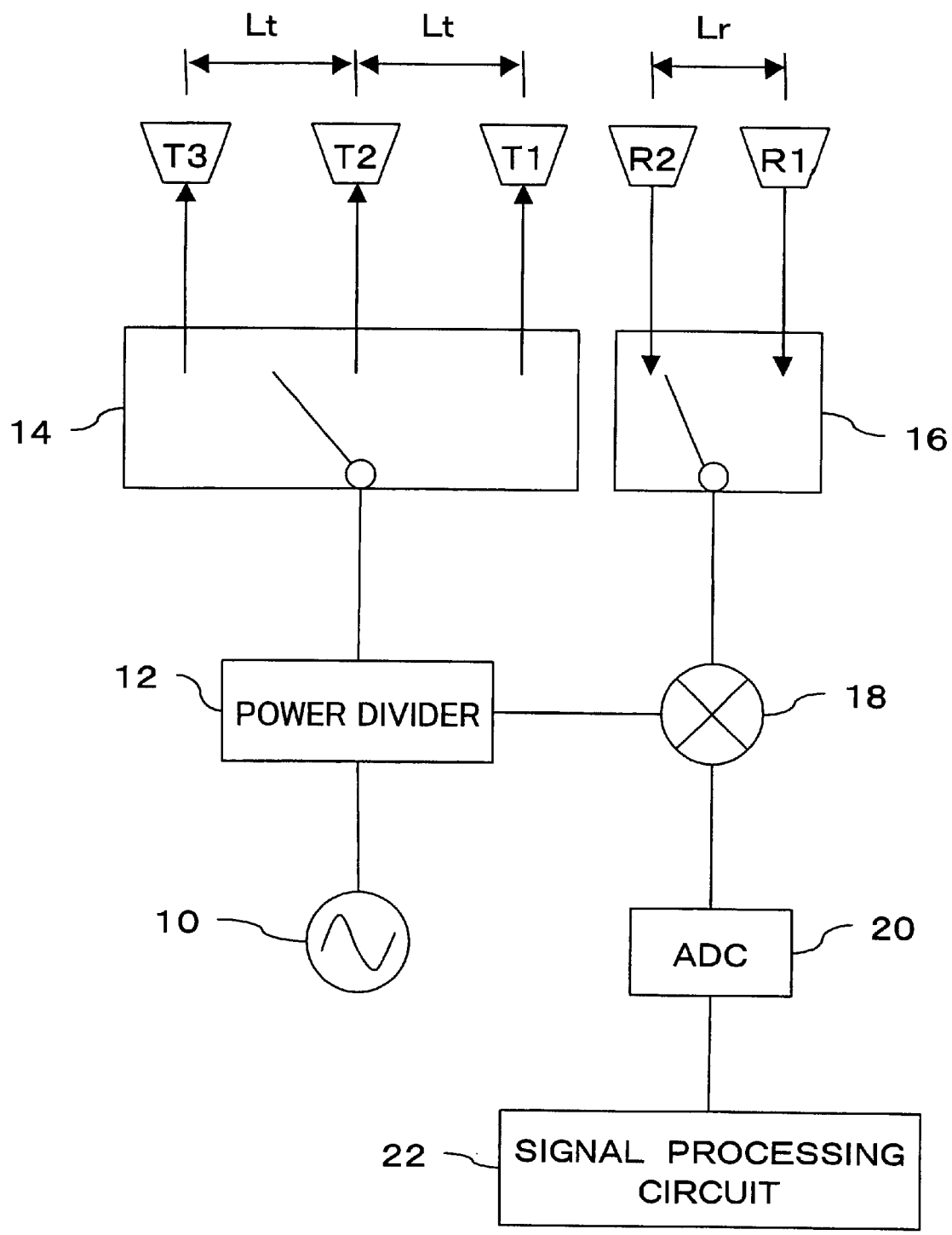
FIG. 1 is a diagram showing the overall configuration of a holographic radar in accordance with an embodiment of the present invention.

Referring first to FIG. 1, there is depicted a configuration of the embodiment of a holographic radar in accordance with the present invention. An oscillator 10 oscillates in a high-frequency band of, for example, 76 GHz. A switch 14 on the transmitter side is connected via a power divider 12 to the oscillator 10. The switch 14 is a single pole triple throw (SP3T) switch whose outputs are coupled to three transmission antennas T1, T2, T3. Switching by the switch 14 therefore allows the high frequency signals from the oscillator 10 to be fed to the transmission antennas T1, T2, T3 in a time-shared manner. The high frequency signals from the oscillator 10 are thus transmitted in sequence from the transmission antennas T1, T2, T3 in a time-shared manner. Note that these transmission antennas have identical radiation pattern, which preferably is the one capable of irradiating a radio wave to the entire detection region.

On the receiver side are provided two reception antennas R1, R2. A switch 16 on the receiver side is coupled to the reception antennas R1, R2. The switch 16 is a single pole double throw (SPDT) switch to which outputs are coupled the two reception antennas R1, R2. A mixer 18 is coupled to the single output of the switch 16. Switching by the switch 16 therefore allows reception signals received by the two reception antennas R1, R2 to be fed to the mixer 18 in a time-shared manner. Note that these reception antennas have identical radiation pattern, which preferably is the one capable of receiving reflection waves from the entire detection region.

The transmission antennas T1 to T3 and the reception antennas R1, R2 lie in alignment on the same plane and on the same straight line. With this alignment, a finished product can be made with a simple shape, allowing production costs to be reduced. Further, in considering application of these antennas to an automotive radar, or the like, the radar can be configured so that their overall shape is favorable to being mounted on an automobile. It is, however, to be noted that those antennas need not necessarily be arranged on the same straight line and on the same plane.

The mixer 18 accepts some of transmission high frequency signals from the power divider 12. The mixer 18 therefore acquires modulated signals in the form of superposition of reception high frequency signals reflected by the target on the transmission high frequency signals. An analog-to-digital converter 20 is coupled to the mixer 18 to convert the modulated signals fed from the mixer 18 into digital signals. A signal processing circuit 22 is coupled to the analog-to-digital converter 20 to receive the modulated signals in the form of digital signals. The signal processing circuit 22 executes data processing of the thus received modulated signals to acquire desired information such as the distance to the target, relative velocity, etc.

In this embodiment, Lt=2Lr is given where Lr is the interval between the reception antennas R1 and R2, and Lt is the respective intervals between the transmission antennas T1, T2 and T3. That is, the interval Lt of the transmission antennas is equal to the interval Lr of the reception antennas multiplied by the number of reception antennas, which is 2 in the present embodiment.

Switching of the transmission antennas T1, T2, T3 and the reception antennas R1, R2 is carried out in conformity with the sequence depicted in FIG. 2. First, in the period where the transmission antenna T1 is active, the reception antenna is switched from R1 to R2. Second, in the period where the transmission antenna T2 is active, the reception antenna is switched from R1 to R2. Third, in the period where the transmission antenna T3 is active, the reception antenna is switched from R1 to R2. These steps are iterated.

FIG. 2 illustrates the relationship in pairs between the transmission antennas T1, T2, T3 and the reception antennas R1, R2, which is utilized in time-sharing when the transmission/reception is carried out with the switching of the transmission antennas T1, T2, T3 and the reception antennas R1, R2.

In this manner, the pairs of the transmission antennas T1, T2, T3 and the reception antennas R1, R2 vary in the sequence of (1) T1, R1, (2) T1, R2, (3) T2, R1, (4) T2, R2, (5) T3, R1 and (6) T3, R2.

Transmission radio waves from the transmission antennas T1, T2, T3 are reflected by the target to reach the reception antennas R1, R2. It may therefore be envisaged that when the transmission antennas move spatially, the identical reception signals will be obtained if the reception antennas are correspondingly moved in parallel therewith in the opposite direction. Hence, reception signals received by the reception antennas R1, R2 upon the transmission from the transmission antenna T2 are expected to be identical to ones obtained when the transmission antenna T2 is moved to the position of the transmission antenna T1 with the antennas R1, R2 being translated by Lt in the opposite direction. Similarly, reception signals received by the reception antennas R1, R2 upon the transmission of the transmission antenna T3 are expected to be identical to ones obtained when the transmission antenna T3 is moved to the position of the transmission antenna T1 with the antennas R1, R2 being translated by 2Lt. FIG. 3 illustrate the time-sequential relationship in pairs between the transmission antennas and the reception antennas, with the positional relationship in the direction in which the antennas are arrayed.

Accordingly, the thus obtained reception signals will become equivalent to ones obtained when six reception antennas are arranged for a single transmission antenna, as can be seen in FIG. 4. In case of placement of six reception antennas in this manner, when only a single receiver is employed, two-stage switching configuration must be employed which consists of two SP3T switches and one SPDT switch.

In this embodiment, however, the switch 14 is required on the transmitter side whereas provision of the switch 16 in a single stage will suffice for the switching of the reception antennas R1, R2. This may result in a reduction in attenuation of the reception signals through the switches. The switch 14 on the transmitter side may subject transmission signals to any attenuation although this will be negligible if the transmission signals have a sufficient signal strength.

As described above, when signal transmission and reception is carried out using transmission and reception antennas being switched accordingly, it is possible to provide a holographic radar having a relatively simple configuration capable of achieving appropriate reception with reduced attenuation in reception signals.

Figure 5:
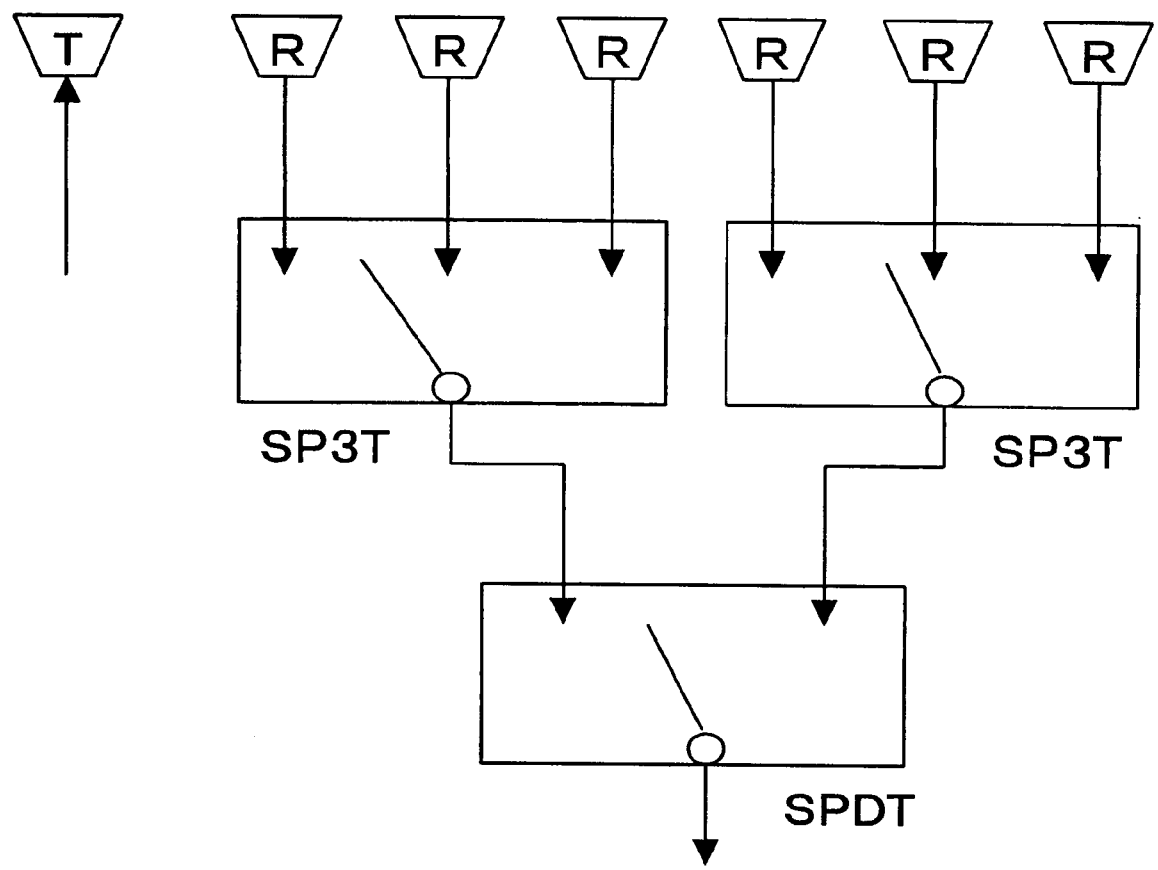
FIG. 5 illustrates the configuration of a comparative example having a single transmission antenna.

As can be seen in the comparative example of FIG. 5, use of one transmission antenna necessitates a total of seven antennas including six reception antennas in addition to the one transmission antenna, together with a total of three switches including two SP3T switches and one SPDT switch. This embodiment of the present invention, however, requires two less antennas, two transmission antennas and three reception antennas, or only five antennas in total.

It also utilizes only two switches in total including one SP3T switch and one SPDT switch. Accordingly, the number of antennas and the number of switches are reduced by two unites and one unit, respectively, compared with the conventional configuration. It is thus possible to achieve a reduction in cost of the device in its entirety. Furthermore, the reduction in the number of switches on the receiver side will lead to an improved reception sensitivity of the device as a whole.

In this embodiment, the number of the transmission antennas is larger than the reception antennas. Accordingly, the reception antenna and the switch are connected through a shorter line compared to a unit wherein there are more reception antennas than transmission antennas, and attenuation on the receiver side can thus be reduced. Also, since the number of time of switching in the switch 16 on the receiver side becomes smaller than that in the switch 14 on the transmitter side, and a less number of times of switching results in a less attenuation, it is possible to reduce loss on the receiver side. As a result, reception sensitivity on the receiver side can be improved.

Although this embodiment employs by way of example two transmission antennas and three reception antennas, the number of these antennas may further be increased. It is to be appreciated that four or more antennas on each side would require a multi-stage configuration of the switches in tournament form. Although the transmission antennas T1, T2, T3 and the reception antennas R1, R2 are shown to be aligned on the same line, they do not necessarily have to be arrayed as such. The intervals between the transmission antennas and the reception antennas could be any arbitrary ones. The intervals between the transmission antennas T1, T2 and T3 could be ones except the above-described values. In such a case, the reception signals may be subjected to any calculations for compensating for positional changes. As described above, it is preferred that the transmission antennas T1, T2, T3 have the same radiation pattern, so that three reception signals received at each reception antennas R1 and R2 for three transmission antennas becomes equal to those received at three positions for a single transmission antenna. Further, it is preferable that the reception antennas R1, R2 have the same radiation pattern, so that reception signals by respective receptions antennas R1, R2 can be compared with one another intact. It should be noted that when the transmission antennas T1, T2, T3 do not have the same radiation pattern or when the reception antennas R1, R2 do not have the same radiation pattern, any calculations for compensating the difference may be applied.

It is preferable that transmission antennas T1, T2, T3 are able to irradiate a radio wave to the entire detection region. This makes it possible to obtain reflection waves from any target within the detection region. Further, it is preferable that each reception antenna R1, R2 be able to receive a radio wave from the entire detection region. This makes it possible to reliably receive reflection waves from any target within the detection region, regardless of which reception antenna is selected.

Also, in the above described preferred embodiment, it is usually preferable that reception antennas R1, R2 be switched during a period when a single transmission antenna T1, T2, or T3 is selected. This makes it easier to maintain a longer period with a single transmission antenna being selected. As a certain amount of time is required for radio wave from a transmission antenna to be reflected by a target and then received by a reception antenna, switching of transmission antennas too early can make it difficult to determine from which transmission antenna the received reflection waves originated. Switching reception antennas while a single transmission antennas is selected can make easier processing with a reception signal.

Such a holographic radar would be suitable e.g., for being mounted on automobile to monitor the forward vehicles.

According to the present invention, as set forth above, switchable use of a plurality of transmission antennas makes it possible to reduce the number of reception antennas. This results in a reduction in the number of switches for switching the reception antennas, contributing to an enhanced reception sensitivity. This also leads to a reduction in the number of antennas and switches, contributing to a curtailed production cost of the device.

In an example wherein m and n are the number of transmission antennas and the number of reception antennas, respectively, then the same functions can be implemented as those obtained when the number of reception antennas is n×m with the number of the transmission antennas being 1. In this proportion, the number of the reception antennas can be reduced. This in turn results in a reduction in the number of switches for switching the reception antennas whereby it is possible to achieve a reduced attenuation in the reception signals and to provide an improved reception sensitivity. It is further possible to reduce the total number of the antennas and switches to thereby accomplish a reduction in costs of the device.

It is preferable that the above transmission antennas and the reception antennas be aligned on the same plane, and especially that they be arrayed in the same line.

Automotive radars are usually required to have monitoring areas narrower (of the order of 3 to 4 degrees) in the vertical direction but wider (of the order of 20 degrees or more) in the horizontal direction with respect to the position where a target to be detected lies. To this end, the radiation patterns of the transmission and reception antennas are preferably designed to conform to their respective monitoring areas. Thus, each antenna tends to have an aperture contour longer in the vertical direction but shorter in the horizontal direction. When a plurality of antennas having such a geometry are used to constitute a holographic radar, all the antennas are arrayed in a line in the horizontal direction on the plane in order to ensure that the automotive radar has the entire geometry suitable for being mounted on automobiles.

It may also be preferable that the interval between the transmission antennas depend on the number of the reception antennas, and particularly preferably, the interval between the transmission antennas be equal to the product of the interval between the reception antennas and the number of the reception antennas. Such a configuration ensures the acquisition of reception signals similar to those obtained by the radars having reception antennas arrayed with equal intervals, facilitating processing of the reception signals.

It may also be preferable that the number of the reception antennas be equal to or less than the number of the transmission antennas. As a result of such a configuration, attenuation on the transmitter side, induced by the switching and the connections between the switches and the antennas, may become larger than that on the receiver side. Nevertheless, such signal attenuation on the transmitter side will be substantially negligible as long as sufficient strength is conferred on the transmission signals. Thus, by reducing the signal attenuation through switches and the connections on the receiver side, the reception sensitivity can be enhanced as a whole.

It is to be appreciated that there may possibly occur a situation in which the interval between the transmission antennas could not be equal to the product of the intervals between the reception antennas and the number of the reception antennas. Such an inconvenience could be dealt with by an additional action for correcting the reception signals during the signal processing.

What is claimed is:

1. A holographic radar comprising:

a plurality of transmission antennas for transmitting a radio wave in accordance with transmission signals to be fed;

a switch on the transmitter side for switching said transmission signals and feeding the same to said plurality of transmission antennas in a predetermined sequence;

a plurality of reception antennas for receiving reflection waves of said radio wave transmitted from said plurality transmission antennas; and a switch on the receiver side for switching in sequence a connection of a reception signal received by said reception antennas to a receiver;

said plurality of transmission antennas transmitting said radio wave in a time-shared manner, said plurality of reception antennas receiving said reflection wave in a time-shared manner, wherein an interval between said plurality of transmission antennas is determined depending on a number of said plurality of reception antennas.

2. A holographic radar according to claim 1, wherein said plurality of transmission antennas and said plurality of reception antennas are arrayed on the same plane.

3. A holographic radar according to claim 2, wherein said plurality of transmission antennas and said plurality of reception antennas are arrayed on the same line.

4. A holographic radar according to claim 3, wherein said interval between said plurality of transmission antennas is equal to the product of an interval between said plurality of reception antennas and the number of said plurality of reception antennas.

5. A holographic radar according to claim 4, wherein said plurality of transmission antennas and said plurality of reception antennas are arrayed on the same line.

6. A holographic radar according to claim 1, wherein a number of said plurality of reception antennas is equal to or less than a number of said plurality of transmission antennas.

7. A holographic radar according to claim 6, wherein the number of said plurality of reception antennas is less than the number of said plurality of transmission antennas.

8. A holographic radar according to claim 1, wherein said plurality of transmission antennas all have a same radiation pattern, and said plurality of reception antennas all have a same radiation pattern.

9. A holographic radar according to claim 8, wherein said plurality of transmission antennas each has a radiation pattern capable of irradiating a radio wave to an entirety of a predetermined detection region.

10. A holographic radar according to claim 8, wherein said plurality of reception antennas each has radiation pattern capable of receiving a radio wave from entirety of a predetermined detection region.

11. A holographic radar according to claim 10, wherein said plurality of transmission antennas and said plurality of reception antennas are arrayed on the same line.

12. A holographic radar comprising:

a plurality of transmission antennas for transmitting a radio wave in accordance with transmission signals to be fed;

a switch on the transmitter side for switching said transmission signals and feeding the same to said plurality of transmission antennas in a predetermined sequence;

a plurality of reception antennas for receiving reflection waves of said radio wave transmitted from said plurality transmission antennas; and a switch on the receiver side for switching in sequence a connection of a reception signal received by said reception antennas to a receiver;

said plurality of transmission antennas transmitting said radio wave in a time-shared manner, said plurality of reception antennas receiving said reflection wave in a time-shared manner;

wherein said plurality of transmission antennas are switched in sequence according to a predetermined order, and said plurality of reception antennas are switched in sequence according to a predetermined order while a single transmission antenna is selected.

13. A holographic radar according to claim 12, wherein said plurality of transmission antennas and said plurality of reception antennas are arrayed on the same line.

* * * * *